US012587232B2

(12) United States Patent
Luo et al.

(10) Patent No.: US 12,587,232 B2
(45) Date of Patent: Mar. 24, 2026

(54) AMBIENT POWER DEVICE-INITIATED SECURE COMMUNICATIONS USING WIRELESS BACKSCATTERING

(71) Applicant: Cypress Semiconductor Corporation, San Jose, CA (US)

(72) Inventors: Hui Luo, Marlboro, NJ (US); Rakesh Taori, McKinney, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/767,795

(22) Filed: Jul. 9, 2024

(65) Prior Publication Data
US 2026/0019100 A1      Jan. 15, 2026

(51) Int. Cl.
| | |
|---|---|
| *H04B 1/7075* | (2011.01) |
| *H02J 50/20* | (2016.01) |
| *H04J 13/00* | (2011.01) |
| *H04L 9/40* | (2022.01) |

(52) U.S. Cl.
CPC ............ *H04B 1/7075* (2013.01); *H02J 50/20* (2016.02); *H04L 63/0428* (2013.01); *H04J 13/0025* (2013.01)

(58) Field of Classification Search
CPC ... H04B 1/7075; H04B 1/709; H04L 63/0428; H04J 13/0025; H04J 13/0029; H04J 13/0033; H04J 13/0048; H04J 13/0062; H02J 50/20

USPC ....... 375/133, 135, 136, 141, 146, 150, 260, 375/262, 265, 343; 370/209, 328, 333; 455/426.1, 426.2, 437–439
See application file for complete search history.

(56) References Cited

U.S. PATENT DOCUMENTS

| | | | |
|---|---|---|---|
| 2017/0180178 A1* | 6/2017 | Gollakota | ................ H04K 3/25 |
| 2019/0158341 A1* | 5/2019 | Talla | ........................ H04L 27/26 |
| 2020/0052734 A1* | 2/2020 | Talla | .................... H04B 1/1081 |
| 2020/0334513 A1* | 10/2020 | Khojastepour | .... G06K 7/10366 |
| 2025/0324243 A1* | 10/2025 | Luo | ..................... H04W 12/043 |

* cited by examiner

*Primary Examiner* — Young T. Tse

(57)      ABSTRACT

A method includes backscattering, by an ambient power (AMP) device that harvests environmental energy, radio frequency (RF) energy received in a wireless signal from at least one of a powered wireless device or a helper wireless device. The method includes causing, by the AMP device, an initialization request frame to be transmitted to the powered wireless device within a backscattered signal using a first spreading code. The first spreading code can encode a predetermined bit pattern, which is recognizable by the powered wireless device, and an identifier (ID) of the AMP device. The method includes receiving, by the AMP device, from the powered wireless device, an ID request frame in response to the powered wireless device detecting the initialization request frame and recognizing the ID of the AMP device. The ID request frame can trigger an attempt to initiate an encrypted wireless communication session with the powered wireless device.

20 Claims, 8 Drawing Sheets

Figure 4:
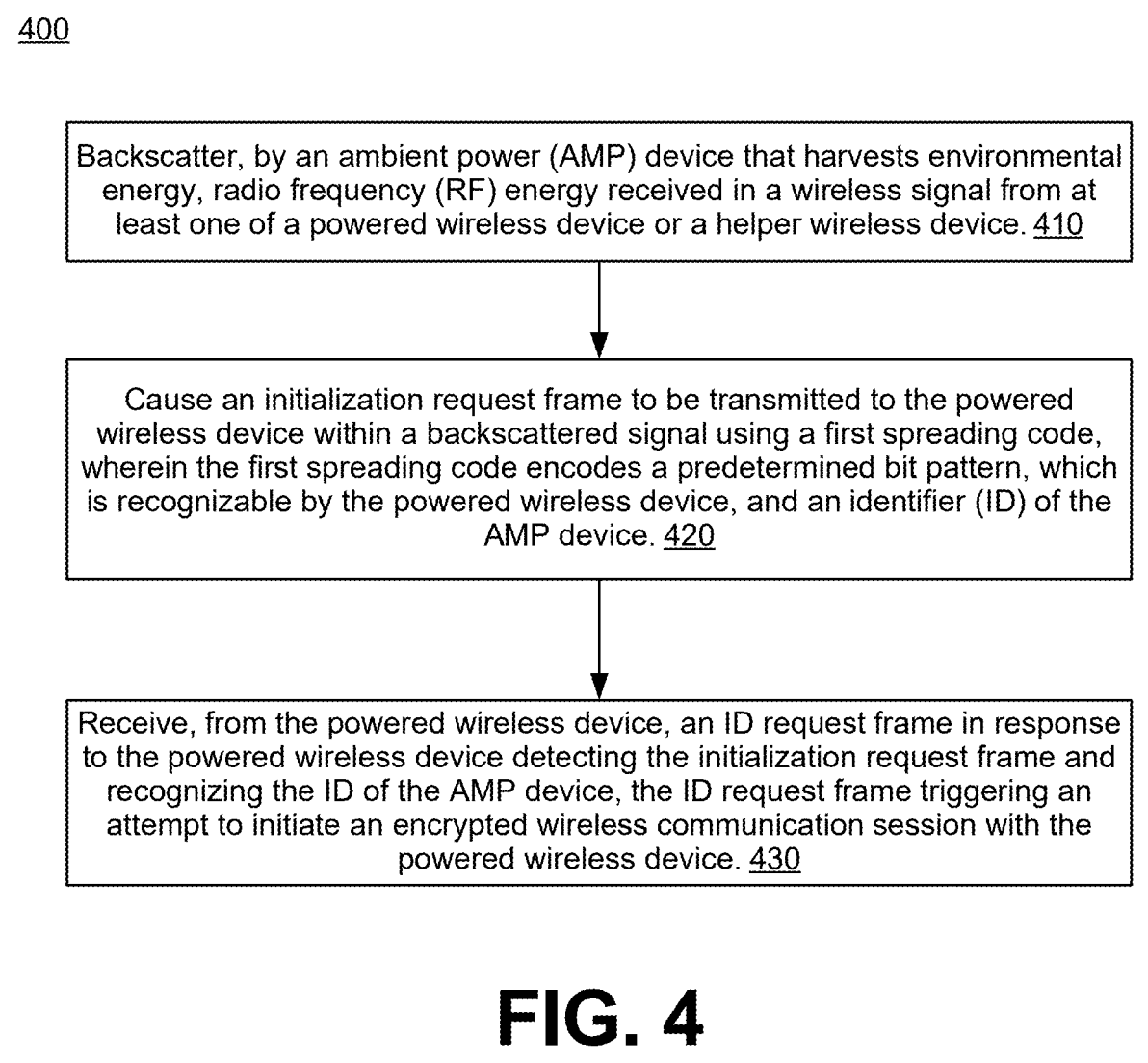

400

Backscatter, by an ambient power (AMP) device that harvests environmental energy, radio frequency (RF) energy received in a wireless signal from at least one of a powered wireless device or a helper wireless device. 410

Cause an initialization request frame to be transmitted to the powered wireless device within a backscattered signal using a first spreading code, wherein the first spreading code encodes a predetermined bit pattern, which is recognizable by the powered wireless device, and an identifier (ID) of the AMP device. 420

Receive, from the powered wireless device, an ID request frame in response to the powered wireless device detecting the initialization request frame and recognizing the ID of the AMP device, the ID request frame triggering an attempt to initiate an encrypted wireless communication session with the powered wireless device. 430

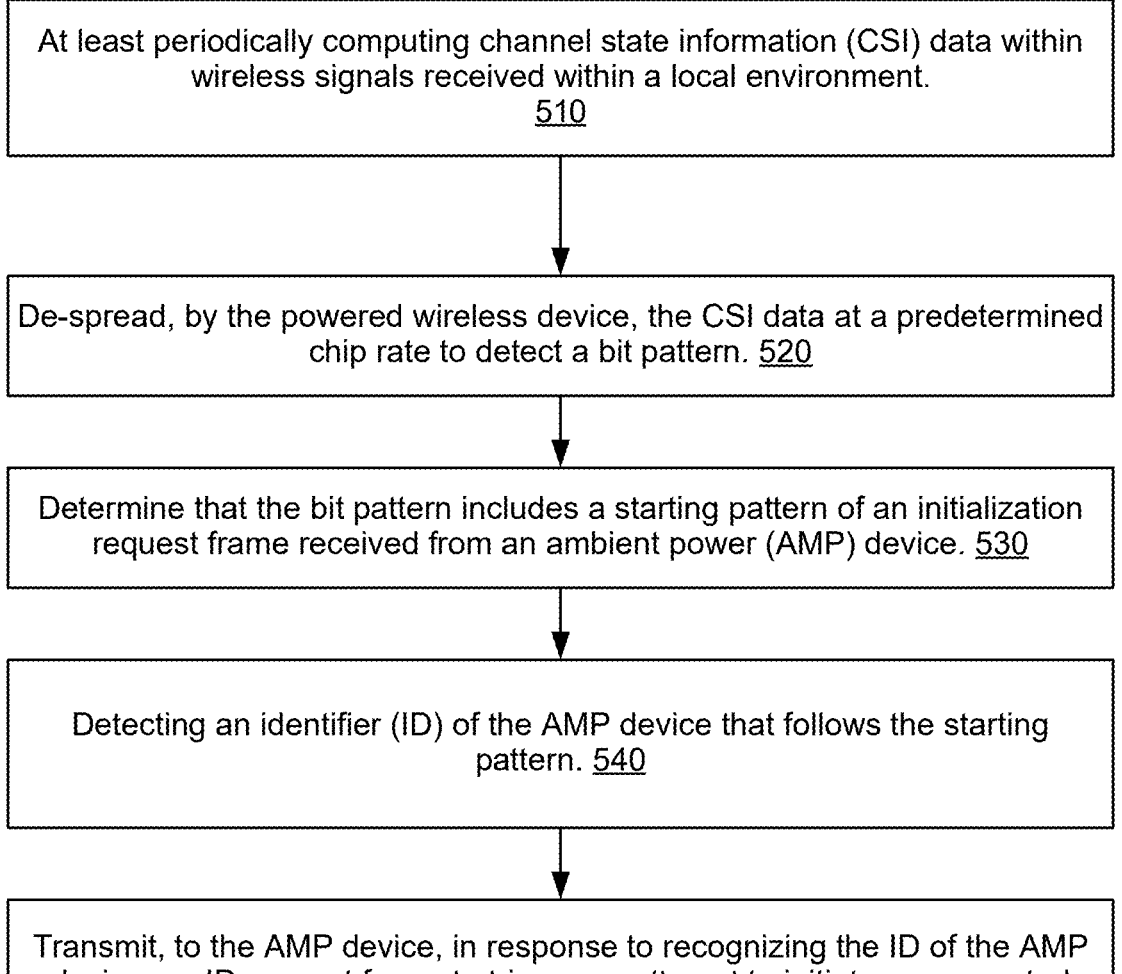

At least periodically computing channel state information (CSI) data within wireless signals received within a local environment.
510

De-spread, by the powered wireless device, the CSI data at a predetermined chip rate to detect a bit pattern. 520

Determine that the bit pattern includes a starting pattern of an initialization request frame received from an ambient power (AMP) device. 530

Detecting an identifier (ID) of the AMP device that follows the starting pattern. 540

Transmit, to the AMP device, in response to recognizing the ID of the AMP device, an ID request frame to trigger an attempt to initiate an encrypted wireless communication session with the AMP device. 550

FIG. 5

AMBIENT POWER DEVICE-INITIATED SECURE COMMUNICATIONS USING WIRELESS BACKSCATTERING

TECHNICAL FIELD

This disclosure relates to wireless devices and, more specifically, to ambient power (AMP) device-initiated secure communications using wireless backscattering.

BACKGROUND

Radio frequency (RF) wireless devices have grown in type and capability. In some wireless local area networks (WLANs), ambient power (AMP) devices, which harvest energy from the environment, can be effectively deployed as low-cost wireless data collection sensors. Some use cases include tagging containers of retail products traveling from and between warehouses and tagging luggage being transported from and between air transportation and within airports. Other use cases include tracking or reporting environmental data such as temperature, proximity, pressure, or light data collected by a sensor. Due to the limited power available for processing incoming requests, AMP devices could use backscattering physical layer (PHY) to initiate communications, but doing so securely is a challenging design problem.

BRIEF DESCRIPTION OF THE DRAWINGS

FIG. 4 is a flow diagram of an example method for initiating secure communication by an AMP device using wireless backscattering according to at least one embodiment.

FIG. 5 is a flow diagram of a method that explains the example method of FIG. 4 from a perspective of a powered wireless device according to at least one embodiment.

DETAILED DESCRIPTION

Figure 1A:
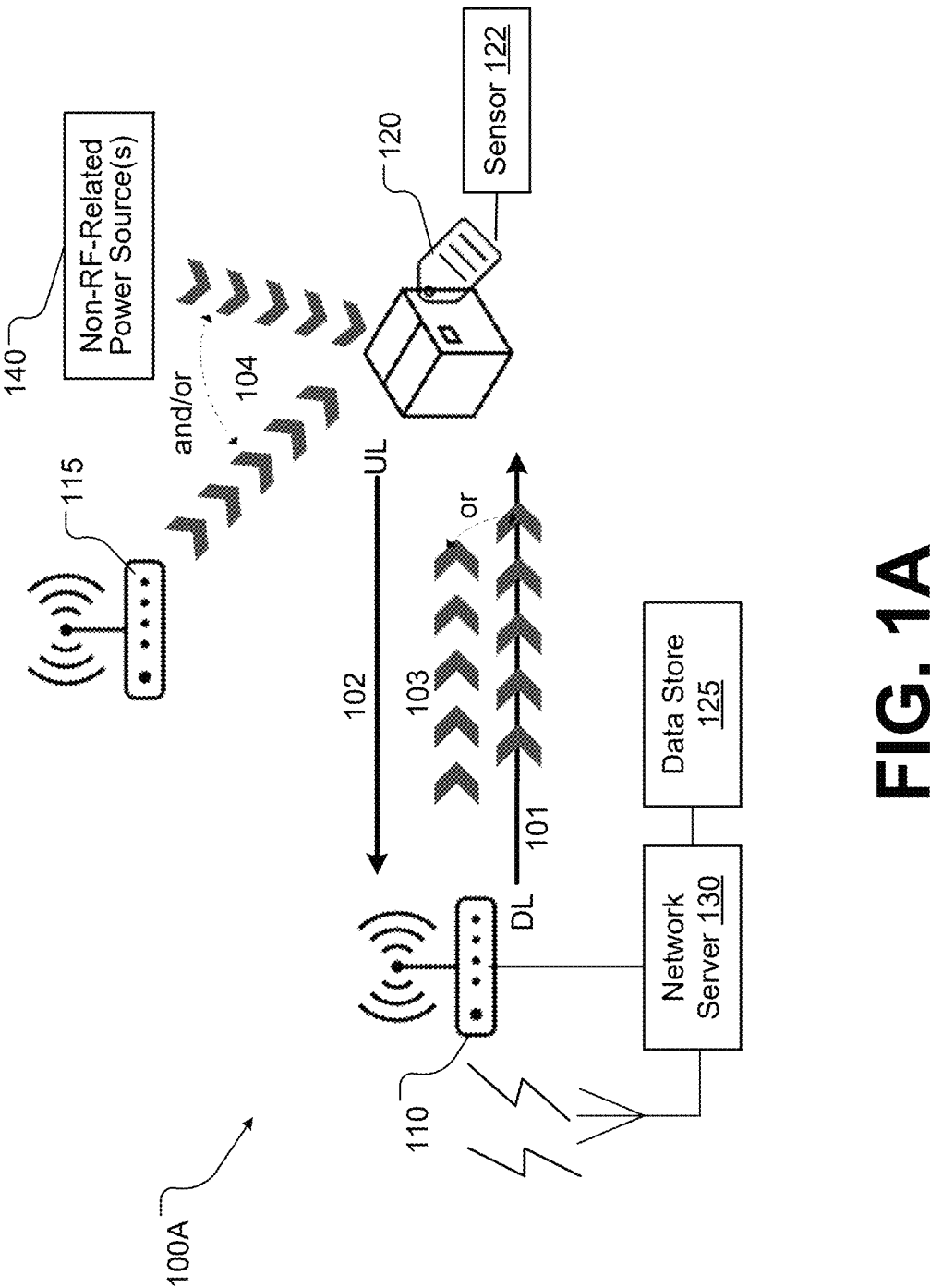
FIG. 1A is a block diagram of an exemplary wireless network configured with RF band arrangements for downlink and uplink transmissions between a powered wireless device and an AMP device according to various embodiments.

The following description sets forth numerous specific details such as examples of specific systems, devices, components, methods, and so forth, in order to provide a good understanding of various embodiments of initiating secure communications by an ambient power (AMP) device using wireless backscattering. Some wireless AMP devices, e.g., AMP wireless clients, are simple wireless devices needing little processing power and memory, and thus can operate with little power. These AMP devices harvest (or scavenge) energy from the environment sufficient for brief and reduced processing. For example, AMP devices may communicate an identifier (ID) and/or other data being gathered by a sensor of or that is coupled to the AMP device. Powered wireless devices, such as routers, access points, powered client devices, etc., may be referenced in this way within mesh networks because the devices receive external continuous power, in contrast to AMP devices which do not receive continuous external power.

Due to the limited power available for receiving and processing incoming requests, as well as processing and transmitting outgoing responses, communication sessions with wireless AMP devices may be initiated and carried out using wireless backscattering, e.g., where the AMP devices function in a responder role when irradiated with sufficient radio frequency (RF) energy. Such wireless communication sessions with AMP devices are often not secured and/or face technical challenges such as ensuring the AMP devices have sufficient energy to both initiate secure communications and transmit sufficient data to provide necessary information (e.g., such as from a coupled sensor or the like). Further, establishing and maintaining an encrypted communication session can require each device participating in the encrypted communication session to maintain constant communication. This type of constant communication is not always possible or feasible for an AMP device.

Additionally, typical communication in a WLAN between wireless clients and powered wireless devices requires extensive handshake protocols to ensure authentication and verification of connected devices (e.g., to establish a secured network or wireless communication session) in addition to encryption of data exchanged between the AMP wireless clients and powered wireless devices (e.g., once the secured wireless communication session is established). For example, many encryption methods can require two devices to transmit several frames of data in order to authorize each device, then several frames to establish an encryption (e.g., determine respective encryption keys) and then one or more frames to transmit and receive encrypted data. These more extensive protocol-based attachment methods are inconsistent with the low-power nature of the AMP devices due to the amount of power required. Without encryption, AMP devices may not be deployed in many practical settings, due to the risk of transmitting and receiving unencrypted data, which risks are increasingly of concern related to Internet of Things (IoT) devices.

Aspects of the present disclosure resolve these and other deficiencies with known approaches to employing AMP devices in WLAN-based systems, by providing methods for AMP devices configured to initiate a secured wireless communication session using wireless backscattering according to various embodiments. For example, in some embodiments, an AMP device transmits an initialization request frame in a backscattered signal having a predetermined bit pattern using a particular spreading code. Because many AMP devices may attempt to initiate such communication with a powered wireless device, the spreading code can be a Gold code or the like that is adept at correlating energy such as to distinguish one spread spectrum from another, e.g., to distinguish one AMP device transmission from another over the same frequency band. In embodiments, the present disclosure provides various methods and systems in which an AMP device can initiate a wireless communication session with a powered wireless device via a minimal exchange of data exchange frames in a way that also secures, e.g., via authentication and/or encryption, the wireless communication session, which hereinafter may be referred to as a secure wireless communication session.

In some embodiments, a method includes backscattering, by an ambient power (AMP) device that harvests environmental energy, radio frequency (RF) energy received in a wireless signal from at least one of a powered wireless device or a helper wireless device, the latter of which can be an access point (AP) device, beacon device, or the like. The method includes causing, by the AMP device, an initialization request frame to be transmitted to the powered wireless device within a backscattered signal using a first spreading code. The first spreading code can encode a predetermined bit pattern, which is recognizable by the powered wireless device, and an identifier (ID) of the AMP device. The method includes receiving, by the AMP device, from the powered wireless device, an ID request frame in response to the powered wireless device detecting the initialization request frame and recognizing the ID of the AMP device. The ID request frame can trigger an attempt, by the AMP device, to initiate an encrypted wireless communication session with the powered wireless device.

In corresponding embodiments from a perspective of the powered wireless device, a method can include at least periodically computing, by a powered wireless device, channel state information (CSI) data within wireless signals received within a local environment, although received signal strength indicator (RSSI) data may also be used along with CSI data. The method can include de-spreading, by the powered wireless device, the CSI data at a predetermined chip rate to detect a bit pattern. The method can include determining that the bit pattern includes a starting pattern of an initialization request frame received from an ambient power (AMP) device. The method can include detecting, by the powered wireless device, an identifier (ID) of the AMP device that follows the starting pattern. The method can include transmitting, to the AMP device, in response to recognizing the ID of the AMP device, an ID request frame to trigger an attempt to initiate an encrypted wireless communication session with the AMP device.

In some embodiments, once the ID request frame is received and acted upon, the AMP device can retrieve a spreading seed value from the ID request frame and generate, using the spreading seed value, a second spreading code that is specific to the AMP device. By doing this, the powered wireless device and the AMP device are able to more securely communicate according to a device-specific spreading code and more efficiently communicate by focusing communication using the device-specific spreading code, e.g., as opposed to using the original spreading code that AMP devices generally may employ in initialization request frames. Further, the powered wireless device is able to concentrate additional wireless RF energy towards the particular AMP device with which it communicates to ensure the AMP device is able to have sufficient power to complete initiation of and carrying out of the secured wireless communication session, as will be discussed.

Advantages of the present disclosure include, but are not limited to, the ability of an AMP device to initiate (and carry out) secure communication with a powered wireless device using wireless backscattering despite the fact that the AMP devices tend to operate infrequently, at low power, and with minimal stored data. Initiating and carrying out such a secure wireless communication session may also be performed despite the AMP device being co-located with many other AMP devices that are likewise trying to communicate with the one powered wireless device. Additional advantages will be apparent to those skilled in the art of WLAN-related data collection and tracking systems that employ AMP devices, and are further discussed below.

FIG. 1A is a block diagram of an exemplary wireless network 100A configured with RF band arrangements for downlink (DL) and uplink (UL) transmissions between a powered wireless device 110 and an AMP device 120, e.g., AMP client wireless device, according to various embodiments. In some embodiments, the powered wireless device 110 is an access point, a router, a wireless hub, a mobile hotspot device, or a wireless (or cellular) base station, a client device, or the like that is externally powered. In some embodiments, the powered wireless device 110 can be externally powered by direct current (DC) voltage sources and/or alternating current (AC) power sources. For example, the powered wireless device 110 can be externally powered by DC power source such as a battery (e.g., a laptop, or mobile phone battery). In another example, the powered wireless device 110 can be externally powered by an AC power source such as a wall socket, or building mains voltage. In various embodiments, the AMP device 120 is a wireless identification tag or a low-power client wireless device or AMP station (STA). As illustrated, the wireless network 100A can include a second powered wireless device 115, a data store 125, and a non-RF-related power source 140.

In some embodiments, the powered wireless device 110 communicates to a network server 130 to upload data to a cloud. In some embodiments, the network server 130 can be a WLAN server. In these embodiments, the network server 130 includes or is coupled to a data store 125 of volatile and/or non-volatile memory, e.g., within cloud-based storage that exists in a local cloud or edge cloud or the like. In this way, data/information collected by the powered wireless device 110 can be stored, by the network server 130, in the data store 125 where the data can optionally be indexed against respective AMP devices 120, e.g., in a database or the like. In various embodiments, the data or information collected and stored includes an identification and/or a location of the AMP device 120, temperature data, humidity data, pressure data, level data (e.g., level of fluid or gas within a container), and/or other data associated with an environment of the AMP device 120. In some embodiments, the data or information is a log or array of information to include a data history of the AMP device 120 that includes environmental data or information collected over time. The sensor-related data may be detected from a sensor 122 (or multiple sensors) included within or coupled to the AMP device 120.

In some embodiments, the network server 130 can perform one or more authentication operations on behalf of the powered wireless device 110. The network server 130 can determine whether the powered wireless device 110 is authorized to communicate with the AMP device 120. If the powered wireless device 110 is authorized to communicate with the AMP device 120, the network server 130 can provide communication parameters to the powered wireless device 110 for the communication between the powered wireless device 110 and the AMP device 120. In some embodiments, the communication parameters can include one or more authentication and key management (AKM) parameters, an encryption key, temporary secrets, or other indicators that cause the powered wireless device 110 to initiate an encrypted wireless communication session with the AMP device 120.

In some embodiments, the network server 130 determines whether the powered wireless device 110 is authorized to communicate with the AMP device 120 based on an ID of the AMP device 120 (e.g., an AMP ID) and an ID associated with the powered wireless device 110 (e.g., a user ID). For example, the powered wireless device 110 can be directed to the network server 130 by the AMP device 120 (e.g., using a network address such as a URL) when the powered wireless device 110 initiates a procedure to establish an encrypted wireless communication session with the AMP device 120. The powered wireless device 110 can request authorization from the network server 130 to communicate with the AMP device 120. If the network server 130 determines the powered wireless device 110 is authorized to communicate with the AMP device 120, the network server 130 can provide one or more AKM parameters, an encryption key, and/or a temporary secret to the powered wireless device 110. The temporary secret can be used by the powered wireless device 110 to generate the one or more AKM parameters and/or an encryption key; although, in some embodiments, the encryption key is directly supplied to the powered wireless device in a secured Internet session.

In many embodiments, there are one or more powered wireless devices 110 and many client wireless devices, which are AMP devices 120, as disclosed herein. AMP devices are energized by harvesting energy from RF signals (e.g., RF-related power sources) and/or from non-RF-related power sources 140 (e.g., the AMP device 120 can harvest environmental energy). In various embodiments, harvested energy from RF-related power sources are from in-band RF power sources (e.g., within the same RF band being used for downlink/uplink (DL/UL) transmissions) or out-of-band RF power sources (e.g., downlink (DL) and uplink (UL) transmissions take place in different RF bands compared to RF band being used for energy harvesting). In additional embodiments, non-RF-related power sources include solar or photovoltaic cells (convert ambient sunlight into electricity), thermoelectric generators (convert temperature gradients into electricity), vibration energy harvesting using piezoelectric, electrostatic, and electromagnetic converters (convert mechanical vibrations from the environment into electricity), miniature wind turbines (convert ambient wind energy into electrical power), pressure differential energy harvesting, dynamos or wearable harvesters (convert human or animal motion into electrical energy), and other such energy-harvesting mechanisms. In some embodiments, the AMP device 120 can harvest environmental energy using one or more collection circuits (e.g., AMP collection circuits). The collection circuits can include circuitry that can harvest any of the above-mentioned electrical potential energy (e.g., the collection circuit can be configured to harvest environmental energy from one or more of the above-listed sources).

With additional reference to FIG. 1A, in at least one embodiment, the powered wireless device 110 transmits a first wireless signal (101), which is a DL transmission, over a first RF band to the AMP device 120. In some embodiments, the first wireless signal includes a data packet (or frame) requesting information from the AMP device 120. The AMP device 120 may receive the first wireless signal and parse the data packet to determine the requested information.

In some embodiments, the powered wireless device 110 does not transmit the energizing RF signal. For example, in other embodiments, the wireless network 100A further includes a second powered wireless device 115 and/or non-RF-related power sources 140 that provide RF power and/or non-RF power, respectively, from which the AMP device 120 harvests environmental energy (e.g., from power sources other than from the powered wireless device 110 associated with the DL/UL transmissions). In at least some embodiments, the second powered wireless device 115 transmits an energizing RF signal (104) towards the client wireless device from which the client wireless device harvests energy. In further embodiments, the energizing signals (101) or (103) are combined with the energizing RF signal (104). Further, non-RF-related energy harvesting may be employed alone or in combination with RF-related energy harvesting.

In embodiments, the AMP device 120 transmits a second wireless signal (102), which is an UL transmission, over a second RF band to the powered wireless device 110 with a data packet (or frame) with the requested information. In this way, the requested information or data (discussed previously) may be requested and received (or just received) from the AMP device 120 through data packet (or data frame) exchange. In various embodiments, the powered wireless device 110 (and/or the second powered wireless device 115) generates the first wireless signal (or the energizing RF signal (4)) employing technology such as Wi-Fi®, Bluetooth®, Bluetooth® Low Energy, Ultra-Wideband (UWB), Z-wave™, Zigbee®, LoRa™, Wi-SUN®, or other wireless protocol. In various embodiments, the AMP device 120 generates the second wireless signal employing technology such as Wi-Fi®, Bluetooth®, Bluetooth® Low Energy, Ultra-Wideband (UWB), Z-wave™, Zigbee®, LoRa™, Wi-SUN®, or other wireless protocol.

In some embodiments, the first RF band for DL transmission differs from the second RF band used for UL transmission. In some embodiments, the second RF band operates at a lower frequency range than that of the first RF band, e.g., as low frequencies consume less power. Lower frequencies also exhibit smaller path losses compared to higher frequencies and, at the same power, the wireless signals can be adequately received and decoded at a farther distance and propagate through or around obstacles better compared to higher frequencies. Further, RF and circuit design at lower frequencies can be far less complex compared to being designed for at higher frequency operation, keeping costs low for the AMP devices 120.

In some embodiments, the second RF band operates at a higher frequency range than that of the first RF band, e.g., higher frequency operations deploy wider channel bandwidths, which in turn allow a transmission of the same number of user bytes and finish earlier. The AMP device 120 may then receive and/or transmit for a shorter period of time, conserving power and providing a separate power consumption benefit. Accordingly, use of a higher frequency range or a lower frequency range with the UL transmission (compared to the DL transmission) may involve a cost-benefit analysis that weighs these benefits as between higher or lower frequency ranges.

In other embodiments, the first RF band is the same as the second RF band, but the DL transmission and the UL transmission occur over different frequencies with significant separation (e.g., more than a few 100 megahertz (MHz) within that same RF band. In these ways, both the technology and RF bands (or frequencies) can differ as between the DL/UL transmissions so that AMP devices 120 can operate at lower power while avoiding frequency conflicts between the DL and UL transmissions.

In various embodiments, the first wireless signal (101), e.g., transmitted in the first RF band, is also an energizing RF signal, illustrated with thick directional indicators, from which the AMP device 120 harvests environmental energy. In similar embodiments, the powered wireless device 110 instead transmits a separate energizing RF signal (103) towards the AMP device 120, but this separate energizing RF signal (103) is also within the first RF band, e.g., is not necessarily the same as the first wireless signal (101), but may be close in frequency. In alternative embodiments, the separate energizing RF signal (103) is transmitted over the second RF band, e.g., of the UL transmission, or is transmitted over an entirely different third RF band. Accordingly, in differing embodiments, the energizing RF signal (103) is sent over the first RF band, the second RF band, or the third RF band. For example, in some embodiments by way of example, the first RF band is 5.0 gigahertz (GHz), the second RF band may be 2.4 GHz, and the third RF band may be 5.0 or 6.0 GHz, where the third RF band may also be employed by the powered wireless device 110 to communicate with other mobile stations (STA).

Data can be communicated between the powered wireless device 110 and the AMP device 120 as frames in a request-and-response protocol. The request-and-response protocol can also be based on a secret that is shared between the network server 130 and the AMP device 120, as described above. The secret can be stored in the data store 125 (or other secure location) and programmed to the AMP device 120 during manufacturing or before deployment within an operational network.

In some embodiments, the request-and-response protocol between the powered wireless device 110 and the AMP device 120 is compatible with the carrier sense multiple access with collision avoidance (CSMA/CA) network protocol. In some embodiments, the request-and-response protocol between the powered wireless device 110 and the AMP device 120 is compatible with the request-to-send/clear-to-send (RTS/CTS) network protocol. In some embodiments, the request-and-response protocol between the powered wireless device 110 and the AMP device 120 is compatible with backscattering, which is discussed in more detail herein.

TABLE 1

| First Field | Second Field | Third Field | Fourth Field | Fifth Field |
|---|---|---|---|---|
| Recipient ID | Sender ID | Frame Type | Data Body | Frame Check Data |

Frames (or packets) can include information organized into at least five fields, as shown in Table 1, although not every frame needs to include every field and some frames may have these fields in different orders, depending on implementation and application. Further, in some of the latter embodiments discussed herein, the AMP ID is encrypted or subject to a hash algorithm within the data body to maintain privacy. In various embodiments, the first field of the frame includes the recipient ID (e.g., the ID of the powered wireless device 110, or the ID of the AMP device 120). In some embodiments, the recipient ID is the media access control (MAC) address of the recipient device, also referred to herein as a destination MAC address. In alternative embodiments, the recipient ID is a unique, pre-assigned ID, (e.g., assigned at manufacturing or before deployment within an operational network). For example, in some embodiments, power harvested by the AMP device 120 is insufficient to perform program operations on non-volatile memory, and the AMP device 120 can have a unique ID (e.g., AMP ID) programmed into non-volatile memory of the AMP device 120 at an initial factory setup with external power. Some request frames received at the AMP device 120 can have the ID of the AMP device 120 in the first field. Some responses received at the powered wireless device 110 can have the ID of the powered wireless device 110 in the first field.

In some embodiments, the recipient ID identifies a particular subset of recipient devices (e.g., multiple AMP devices 120). For example, the recipient ID can be a subset of MAC addresses (e.g., a group address such as a MAC multicast address) corresponding to the particular subset of AMP devices 120. In some embodiments, the recipient ID identifies any recipient device (e.g., any AMP device 120) within a wireless connection range of a sender device (e.g., the powered wireless device 110). For example, the recipient ID can be a MAC broadcast address such as FF:FF:FF:FF:FF:FF.

In various embodiments, the second field of the frame includes the sender ID (e.g., the ID of the powered wireless device 110 or the ID of the AMP device 120, generally referred to as a transmission device). In various embodiments, the third field of the frame includes the frame type, which can identify the type of frame, e.g., initialization request frame, ID response frame, data request frame, data response frame. In some embodiments, the frame type identified in the third field is based on or defines information located in the data body of the fourth field.

In various embodiments, the fourth field of the frame includes the data body, which can include frame-exchange parameters, data, commands, AKM parameters (e.g., Simultaneous Authentication of Equals (SAE)), cipher suites (e.g., Advanced Encryption Standard (AES), such as AES 128-bit (AES128)), physical layer (PHY) parameters for guiding frame transmission to reduce conflicts, a random value, a nonce value, and session information (e.g., a session number). The random and/or nonce values may be employed to prevent a man-in-the-middle attack and/or a replay attack. In some embodiments, some portions of the data body can be secured, such as by encryption or hashing, as will be discussed in more detail depending on embodiment.

In some embodiments, the AKM parameters can include one or more cryptographic parameters. In some embodiments, the AKM parameters include a scalar value that can be an input into an encryption algorithm and an element value that can be an output of the encryption algorithm. In some embodiments, the encryption algorithm is associated with an elliptical curve, where the scalar value denotes a position on the elliptical curve, and the element value represents the position on the elliptical curve that is selected by the scalar value.

In various embodiments, the fifth field of the frame includes frame check data, although not every frame or packet need include frame check data. The frame check data can be data that can be used by the receiving device (e.g., the powered wireless device 110 or the AMP device 120 respectively) to verify that the frame (or packet) was received without errors or modification. In some embodiments, the frame check data can include unsecured error check data such as checksum data, cyclic redundancy check (CRC) data, or secured (e.g., encrypted or hashed) error check data such as message integrity code (MIC) data depending on the application and level of network attachment.

Figure 1B:
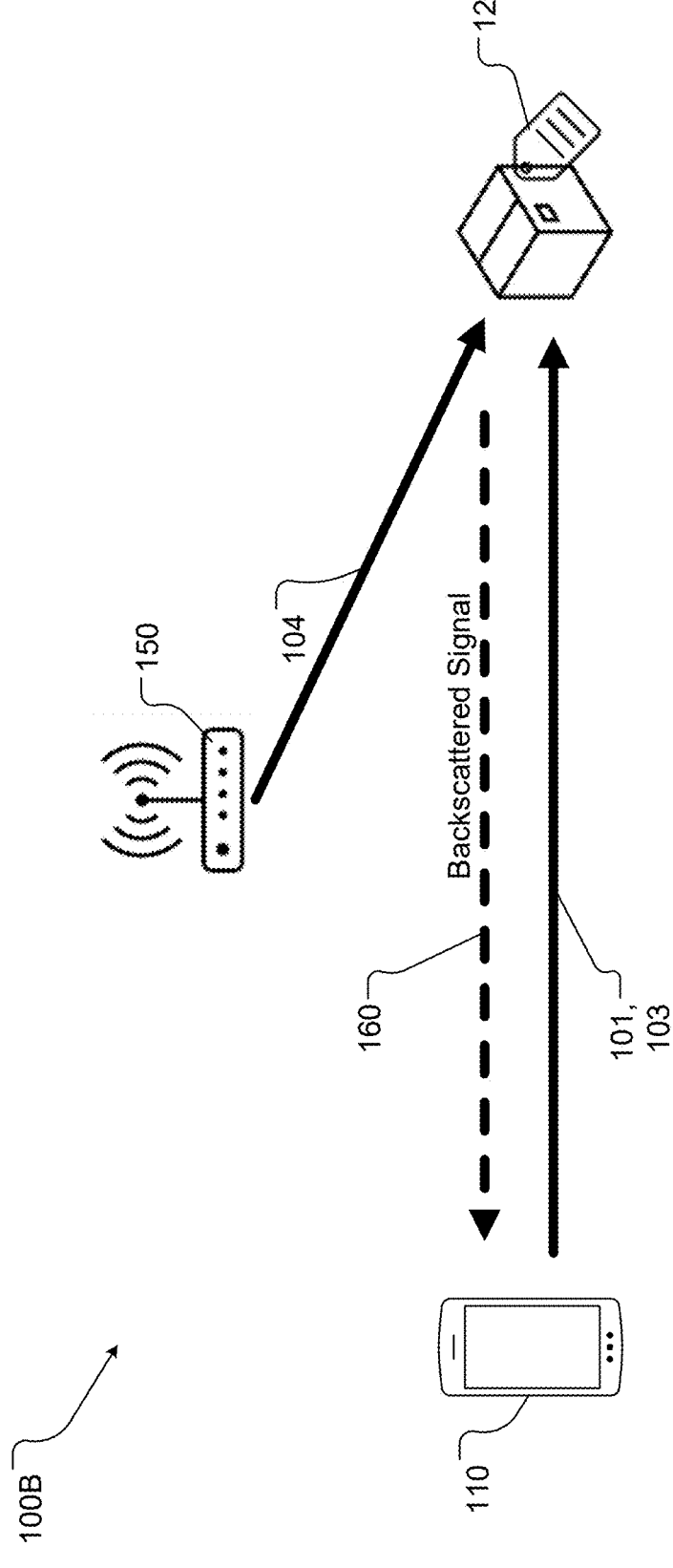
FIG. 1B is a block diagram of an exemplary wireless network configured for an AMP device to generate a backscattered signal using a spreading code to initiate secure communications with a powered wireless device according to some embodiments.

FIG. 1B is a block diagram of an exemplary wireless network 100B configured for an AMP device, such as the AMP device 120 of FIG. 1A, to generate a backscattered signal using a spreading code to initiate secure communications with a powered wireless device according to some embodiments. For example, in some embodiments, the powered wireless device 110 can provide power to the AMP device 120 in an energizing RF signal such as energizing RF signal 101 and/or 103. Further, a helper wireless device 150 (such as the second powered wireless device 115 in FIG. 1A) can also provide power in an energizing RF signal such as energizing RF signal 104. In some embodiments, the energizing RF signal(s) can irradiate the AMP device 120, imparting RF energy or power to the AMP device 120, which can then reflect and/or absorb the energizing RF signal in what is known as a backscattered signal 160. In this way, the AMP device 120 can function as a transponder. The energizing RF signal(s) can also at least partially power the AMP device 120 sufficiently to process data in order to establish a secure wireless communication session with the powered wireless device 110, as explained previously and discussed in more detail hereinafter.

In some embodiments, the AMP device 120 can encode, within the backscattered signal 160, a series of bits, e.g., digital ones and zeros. So, for example, the AMP device 120 can vary the impedance of an antenna (see FIG. 6) at a known rate (e.g., 100 Hz, 200 Hz, or the like), also known as a chip rate, to send a binary sequence by reflecting and absorbing wireless signals. For example, the AMP device 120 can maximize reflection of the RF energy, which can indicate a one value, or maximize absorption (and thus minimize reflection) of the RF energy, e.g., which can indicate a zero value. In some embodiments, the AMP device 120 employs a spreading code using the chip rate, which are both known to the powered wireless device 110, to communicate with the powered wireless device 110 using spread spectrum within the backscattered signal 160. Further, the spreading code at the chip rate can also be employed by other AMP devices in the area to initialization contact with the powered wireless device. In various embodiments, the spreading code includes, for example, M-sequences, Kasami sequences, Barker codes, Walsh codes, pseudo-noise sequences, Zadoff-Chu sequences, or Gold codes.

In embodiments, the chip rate can be understood as the number of chips transmitted per second in a spread spectrum communication system, e.g., which is measured in chips per second (CPS). Thus, in spread spectrum systems like CDMA (Code Division Multiple Access), the data signal (i.e., here, the backscattered signal 160) is spread over a wider bandwidth using a spreading code. Each bit of the original data can be replaced by a sequence of smaller units called chips. Chips are the elements of the spreading code, and their duration is shorter than that of the original data bits. The chip rate can therefore be higher than the data bit rate. For example, the chip rate can be the data rate times a spreading factor of the spreading code.

Figure 2:
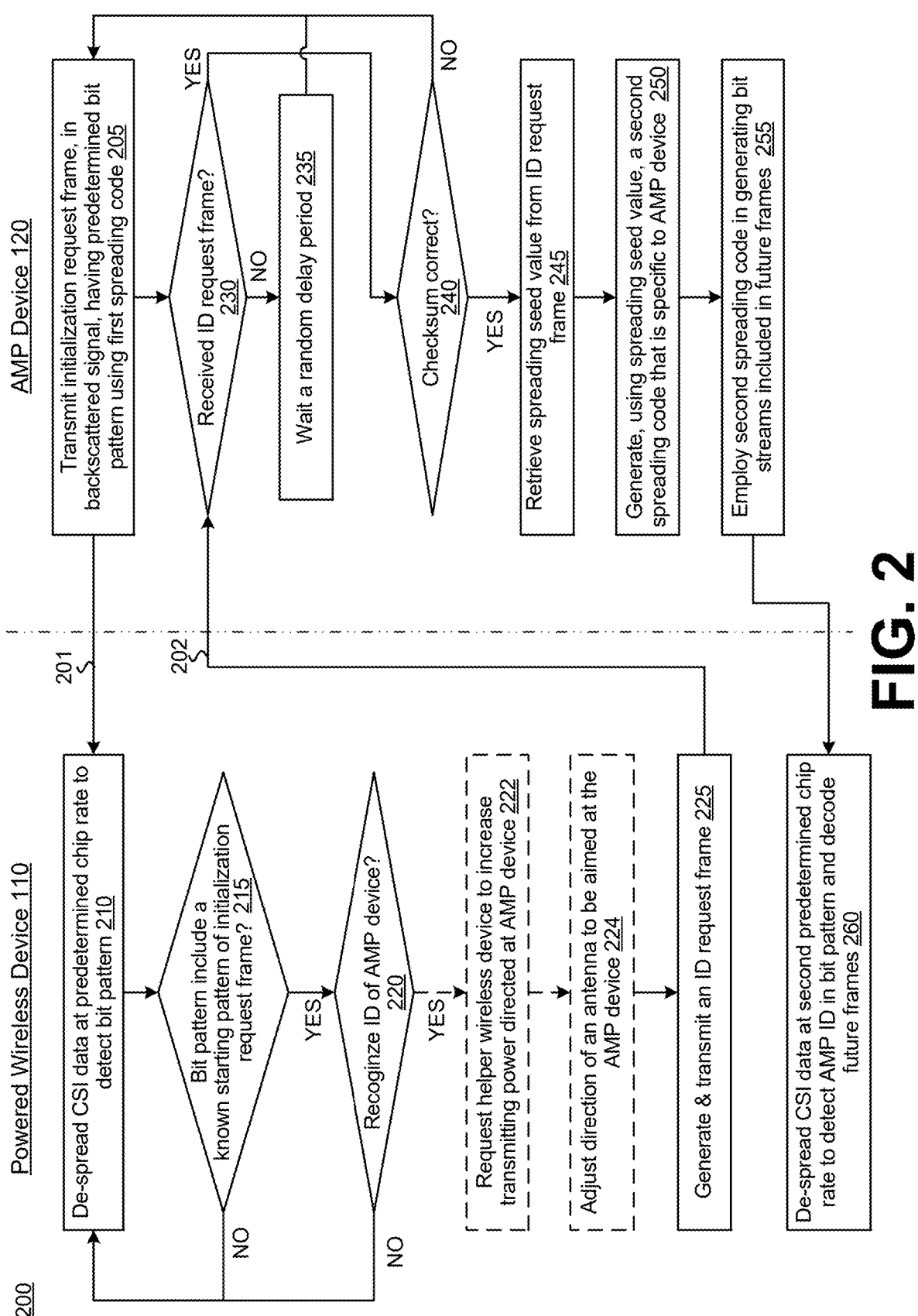
FIG. 2 is a flow diagram of an example method for initiating secure communication by an AMP device using wireless backscattering according to some embodiments.

FIG. 2 is a flow diagram of an example method 200 for initiating secure communication by an AMP device using wireless backscattering according to some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by processing logic of the powered wireless device 110 and/or by a representative AMP device 120 (FIGS. 1A-1B) depending on operation. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the AMP device 120 transmits an initialization request frame 201, in a backscattered signal, having a predetermined bit pattern using a first spreading code. Just as one example, the predetermined bit pattern can be 0xAC53. In some embodiments, the predetermined bit pattern is a starting pattern known and thus detectable by the powered wireless device 110. In some embodiments, the starting pattern is followed by an identifier (ID) of the AMP device 120 within the initialization request frame 201. Whichever spreading code is used (see FIG. 1B), the length of the spreading code should be adequately long, so that the powered wireless device 110 can detect the initialization request frame 201 reliably and detect multiple AMP devices sending initialization request frames around the same time period. Thus, the length of the spreading code that generates the starting pattern may depend on application and how many AMP devices are expected in a vicinity of the powered wireless device 110.

At operation 210, the powered wireless device 110 de-spreads CSI data at a predetermined chip rate to detect the predetermined bit pattern within the initialization request frame 201. In some embodiments, the de-spreading includes analyzing RSSI data to help detect the bit pattern. Thus, for example, the CSI data can also include received signal strength indicator (RSSI) data, and the method 200 further includes also using the RSSI data for de-spreading the CSI data to detect the bit pattern.

At operation 215, the powered wireless device 110 determines whether the predetermined bit pattern includes a known starting pattern of the initialization request frame 201. For example, the powered wireless device 110 can store a starting pattern to be used to recognize incoming initialization request frames. If the starting pattern is not detected, the method 200 flows back to operation 210 and continues de-spreading CSI (and optionally also analyzes RSSI) data to determine detect bit patterns, which can come in any number of initialization request frames from multiple AMP devices.

At operation 220, in response to detecting the starting pattern, the powered wireless device 110 determines whether it recognizes the identifier (ID) of the AMP device 120 that follows the starting pattern. If it does not, the method 200 flows back to operation 210 and continues de-spreading CSI data.

At operation 222, in response to recognizing the ID of the AMP device 120 at operation 220, the powered wireless device 110 can optionally transmit a request to the helper wireless device 150 that causes the helper wireless device 150 to increase transmitting power directed at the AMP device 120.

At operation 224, in response to recognizing the ID of the AMP device 120 at operation 220, the powered wireless device 100 can further, in addition or instead of operation 222, adjust a direction of an antenna of the powered wireless device 110 to be aimed at the AMP device 120. This type of beamforming can better direct the RF energy of the energizing RF signal(s) at the AMP device 120, which can then better complete the following operations to establish and complete the secured wireless communication session.

At operation 225, the powered wireless device 110 generates and transmits, to the AMP device 120, an ID request frame 202 to trigger an attempt to initiate an encrypted wireless communication session with the AMP device.

At operation 230, the AMP device 120 determines whether it has received an ID request frame 202. Thus, for example, the AMP device 120 monitors the RF signals received out of the air for such an ID request frame 202.

At operation 235, the AMP device 120 waits a random delay period in response to not receiving the ID request frame 202. In some embodiments, the random delay period is pseudo-random delay period, e.g., as can be generated by the AMP device 120. Further, the method 200 flows back to operation 205, where the AMP device 120 causes, after waiting the random delay period, the initialization request frame 201 to be retransmitted to the powered wireless device 110. In this way, given the need to reattempt being recognized by the powered wireless device 110, the AMP device 120 can try avoiding overlapping with other communication signals (e.g., of other AMP devices and/or powered wireless devices) by retransmitting the initialization request frame 201 at a random time.

At operation 240, in response to receipt of the ID request frame 202, the AMP device 120 determines whether a checksum value, which is included in the ID request frame 202, is correct (e.g., see Frame Check Data in Table 1). If it is not correct, the method 200 flows back to operation 205 to retransmit the initialization request frame 201. Other checks (e.g., authentication) are also possible here, such as decrypting or hashing data included in the body of the ID request frame to be compared with known values (e.g., cleartext values or previously hashed values).

At operation 245, in response to getting a correct checksum value at operation 240, the AMP device retrieves a spreading seed value from the ID request frame 202. For example, the ID request frame 202 can include the spreading seed value from which the AMP device is to determine a device-specific spreading code. A spreading seed value can be, for example, an initial value or set of values used to generate a pseudo-random sequence, which in turn is used as the spreading code in spread spectrum communication.

For example, the spreading seed value can be employed in deterministic algorithms that produce the spreading codes. In various embodiments, spreading codes are derived from pseudo-random sequences, which appear random but are generated by deterministic processes. The spreading seed acts as the starting point for these processes. One method to generate pseudo-random sequences is using linear feedback shift registers (LFSRs) although other processes are envisioned. The spreading seed initializes the LFSR, which then cycles through a sequence of states to produce the spreading code. The use of a spreading seed ensures that the pseudo-random sequence (spreading code) can be reproduced exactly by both the transmitter and the receiver (e.g., by the AMP device 120 and the powered wireless device 110, respectively), provided both use the same seed and generation algorithm.

In some embodiments, the device-specific spreading code is shorter than the original spreading code. In other embodiments, the device-specific spreading code is transmitted at the predetermined chip rate or eliminates spread-spectrum transmission altogether. For example, by shortening the spreading code or eliminating spread-spectrum transmission altogether, the AMP device 120 can reduce power consumption while still allowing direct communication with the powered wireless device 110, which has recognized the AMP ID of the AMP device 120.

At operation 250, the AMP device 120 generates, using the spreading seed value, a second spreading code that is specific to the AMP device 120, e.g., a device-specific spreading code for use in further communication with the powered wireless device 110 during the secure wireless communication session.

At operation 255, the AMP device 120 employs the second spreading code (e.g., device-specific spreading code) to generate bit streams that are included in future frames transmitted to the powered wireless device, which will be discussed in more detail with reference to FIGS. 3A-3B. Such future frames may include, at the beginning of the frame, the ID of the AMP device 120 so that it can be detected by the powered wireless device 110 and correlated with the correct AMP device.

At operation 260, the powered wireless device 110 de-spreads CSI data at a second or updated predetermined chip rate to detect the AMP ID in the bit pattern and decode these future frames, which will be discussed in more detail with reference to FIGS. 3A-3B.

Figure 3A:
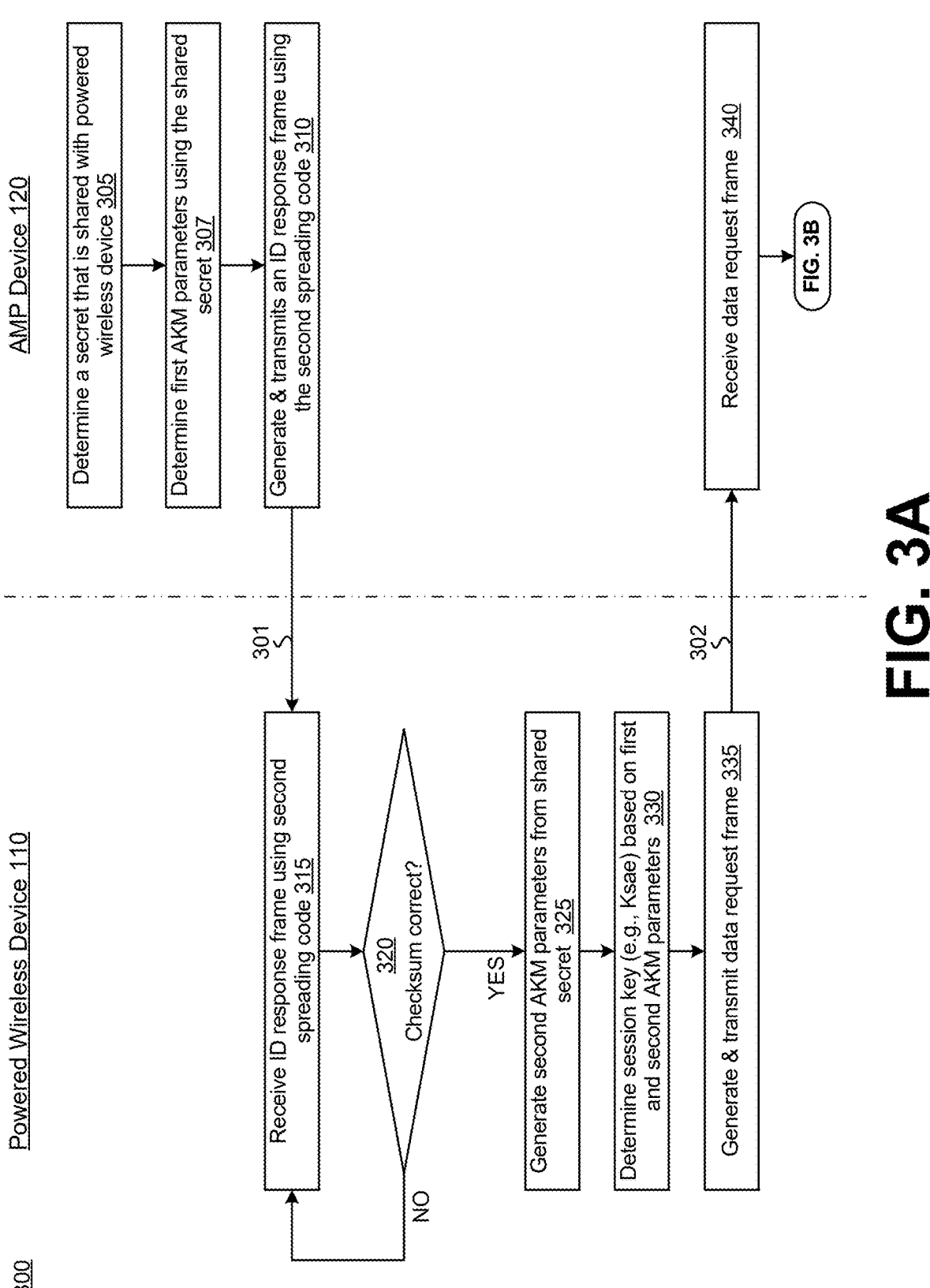
FIG. 3A and FIG. 3B are a flow diagram of an example method for securing a transaction initiated by an AMP device using wireless backscattering according to some embodiments.
Figure 3B:
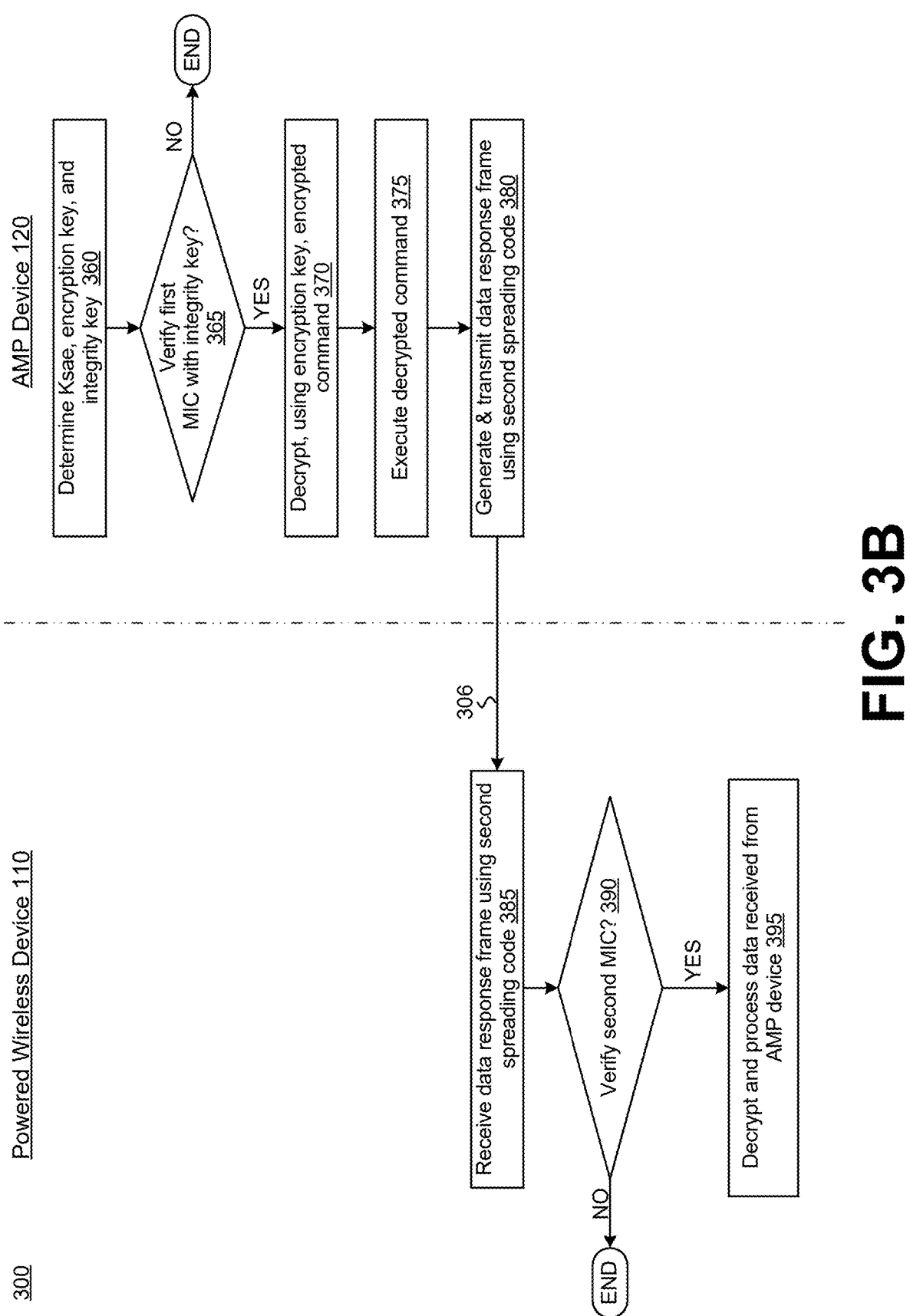

FIG. 3A and FIG. 3B are a flow diagram of an example method 300 for securing a transaction initiated by an AMP device using wireless backscattering according to some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by processing logic of the AMP device 120 that harvests environment energy and of one or more powered wireless devices 110 (FIG. 1A and FIG. 1C). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the AMP device determines a secret that is shared with the powered wireless device 110.

At operation 307, the AMP device 120 determines one or more first authentication and key management (AKM) parameters, e.g., using the shared secret.

At operation 310, the AMP device 120 generates and transmits, to the powered wireless device 110, using the second spreading code (generated at operation 250 of FIG. 2), an ID response frame 301. In some embodiments, the ID response frame 301 includes the ID of the AMP device, the session ID, and the one or more first AKM parameters with which the powered wireless device 110 is to be mutually authenticated with the AMP device 120 and to generate an encryption key to initiate an encrypted wireless communication session. In some embodiments, the AMP device 120 causes the ID of the AMP device 120 to be listed first in the ID response frame 301 to signal to the powered wireless device 110 that the ID response frame 301 is from the AMP device 120. The ID response frame 301 may also include one or more frame-exchange parameters and a checksum value.

In an alternative embodiment, at operation 310, the AMP device 120 includes, in the ID response frame 301, a first plurality of cleartext fields and a first hash value generated from a combination of a content of the first plurality of cleartext fields and an identifier of the AMP device (e.g., the AMP ID). In embodiments, the first plurality of cleartext fields includes, for example, a session identifier, one or more frame-exchange parameters, and optionally a random value and/or a nonce value. A combination of different values than these are envisioned and thus specifically listed values for different frames herein are by example only.

At operation 315, the powered wireless device 110 receives the ID response frame 301 from the AMP device 120, e.g., by performing operation 260 of FIG. 2. For example, the powered wireless device 110 can de-spread the CSI data at an updated chip rate, corresponding to the device-specific spreading code, to detect a second bit pattern in which is encoded the ID response frame 301 received from the AMP device 120. In embodiments, the ID response frame 301 includes an ID of the AMP device 120, which is positioned first, the session ID, and one or more first aAKM parameters. The powered wireless device 100 can further, in response to detecting the ID of the AMP device 120, decode a remainder of the ID response frame received from the AMP device 120 to obtain the first AKM parameters with which to initiate the encrypted wireless communication session with the AMP device 120.

At operation 320, the powered wireless device 110 verifies whether the checksum value of the received ID response frame 301 is correct. If the error-checking value is not correct, the method 300 ends, e.g., the powered wireless device 110 returns to operation 315 and continues monitoring for an ID response frame. If the error-checking value is correct, the powered wireless device 110 proceeds to operation 325.

In the alternative embodiment, at operation 320, the powered wireless device 110 generates a second hash value from a combination of the content of the cleartext fields and the ID of the AMP device retrieved from memory of the powered wireless device 110. Further, at operation 320, the powered wireless device 110 determines whether the first hash value matches the second hash value. In response to determining that the first hash value does not match the second hash value, the powered wireless device 110 returns to operation 315 and continuous monitoring for an ID response frame. In response to determining that the first hash value matches the second hash value, the powered wireless device 110 passes to operation 325. This alternative embodiment of employing hash values can be most viable where there are a small number of AMP devices (and thus the powered wireless device 110 has limitations on the number of hashing operations to be performed to verify authorization of access to those AMP devices).

At operation 325, in response to determining, at operation 320, that the checksum value is correct or that the first hash value matches the second hash value (in the alternative embodiment), the powered wireless device 110 generates second (AKM parameters. For example, the powered wireless device 120 can retrieve, from memory, a secret that is shared with the AMP device 120, select an AKM method to be employed, and generate, using the secret and the AKM method, the one or more first AKM parameters. For example, the secret can be stored in memory (e.g., in a data structure, as an entry in a lookup table, a matrix, a linked list, a data file, or the like) based on the identifier of the AMP device 120. In another example, a first secret can be stored (and used) with respect to a first one or more AMP device(s) 120, and a second secret can be stored (and used) with respect to a second one or more AMP device(s) 120.

In various embodiments, AKM methods include one or more of a password-based challenge and response, simultaneous authentication of equals (SAE), public/private key trust method (e.g., using security certificates), or the like. In some embodiments, the AKM method is based on a cipher block, where data is encrypted in fixed-size blocks (e.g., 64 bits, 128 bits, etc.). Plaintext can be divided into blocks and each block is independently encrypted using the same encryption key, where encryption of each block can be dependent on encryption of a previous block. In alternative embodiments, the AKM method is based on a cipher stream, where data is encrypted bit by bit. Plaintext can be combined with a pseudorandom stream of bits (e.g., cyphertext) using a bitwise exclusive-or (XOR) function.

At operation 330, the powered wireless device 110 determines a session key from the first AKM parameters and the second AKM parameters. The session key can be, for example, a Ksae derived during an SAE authentication process, e.g., where each of the powered wireless device 110 and the AMP device 120 prove to each other that each knows the shared secret without actually exchanging the shared secret. Other key-generation procedures are envisioned as well. Also at operation 330, the powered wireless device 110 can, using the session key, generate an encryption key and an integrity key.

At operation 335, the powered wireless device 110 generates and transmits a data request frame 302 to the AMP device 120 in order to obtain data desired from the AMP device 120, such as sensor or environment data as previously discussed. Also as part of operation 335, in some embodiments, the powered wireless device 110 encrypts a command (e.g., a data request command) using the encryption key and determines a first message integrity code (MIC) using the integrity key. In some embodiments, the data request frame 302 includes one or more frame-exchange parameters, one or more second AKM parameters, the first MIC, and the encrypted command. The data request frame 302 can optionally also include the session ID and a nonce value. In some embodiments, the frame-exchange parameters include a cipher type (e.g., a cipher suite). The cipher type can be associated with an AKM method. In some embodiments, the cipher type is associated with a cipher algorithm (as described above). As described above, the AMP device 120 selects the AKM method. In some embodiments, the powered wireless device 110 can select the AKM method.

At operation 340, the AMP device 120 receives the data request frame 302 transmitted by the powered wireless device 110. In some embodiments, the data request frame 302 includes one or more second AKM parameters generated by the network server, a first message integrity code (MIC) determined using an integrity key generated from a session key received from the network server, and an encrypted command determined with an encryption key generated from the session key.

With additional reference to FIG. 3B, at operation 360, the AMP device 120 determines an encryption key and an integrity key using the one or more first AKM parameters and the one or more second AKM parameters. For example, as the powered wireless device 110 did at operation 330, the AMP device 120 that now has the second AKM parameters from the data request frame 302 can determine the session key (or Ksae). Also at operation 360, the powered wireless device 110 can, using the session key, generate the encryption key and the integrity key.

At operation 365, the AMP device 120 determines whether the first MIC is verified with the integrity key. In response to the first MIC not being verified, the AMP device 120 terminates a procedure of establishing an encrypted wireless communication session with the powered wireless device 110.

At operation 370, in response to the first MIC being verified, the AMP device 120 decrypts, using the encryption key, the encrypted command to generate a decrypted command.

At operation 375, the AMP device 120 executes the decrypted command, e.g., to determine what data is desired and to retrieve the desired data or information. In some embodiments, executing the decrypted command includes generating a second MIC using the integrity key and generating encrypted data using the encryption key to encrypt data including at least one of status or environmental data retrieved from a coupled sensor.

At operation 380, the AMP device 120 generates and transmits a data response frame 306, using the second spreading code, that includes the second MIC and the encrypted data. In some embodiments, the data response frame 306 also includes a session ID and optionally also a nonce value.

At operation 385, the powered wireless device 110 receives the data response frame 306 from the AMP device 120, e.g., by performing operation 260 of FIG. 2. For example, the powered wireless device 110 can de-spread the CSI data at an updated chip rate, corresponding to the device-specific spreading code, to detect a second bit pattern in which is encoded the data response frame 306 received from the AMP device 120. In embodiments, the data response frame 306 includes an ID of the AMP device 120, which is positioned first, the session ID, encrypted data, and a second MIC. The powered wireless device 100 can further, in response to detecting the ID of the AMP device 120, decode a remainder of the data response frame 306 received from the AMP device 120 to obtain the remainder of the data response frame 306.

At operation 390, the powered wireless device 110 determines whether the second MIC is verified. In response to the second MIC not being verified, the powered wireless device 110 terminates a procedure of establishing an encrypted wireless communication session with the AMP device 120.

At operation 395, in response to the second MIC being verified, the powered wireless device decrypts and processes the decrypted data received from the AMP device 120.

FIG. 4 is a flow diagram of an example method 400 for initiating secure communication by an AMP device using wireless backscattering according to at least one embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by processing logic of the AMP device 120 that harvests environment energy (FIG. 1A and FIG. 1B). The AMP 120 device 120 can include at least one antenna, which can be coupled to the processing logic, as discussed in relation to FIG. 6. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic is to cause the at least one antenna to backscatter radio frequency (RF) energy received in a wireless signal from at least one of a powered wireless device or a helper wireless device, e.g., reflected as a backscattered signal.

At operation 420, the processing logic causes the at least one antenna to transmit an initialization request frame to the powered wireless device within a backscattered signal using a first spreading code. In embodiments, the first spreading code encodes a predetermined bit pattern, which is recognizable by the powered wireless device, and an identifier (ID) of the wireless device.

At operation 430, the processing logic causes the at least one antenna to receive, from the powered wireless device, an ID request frame in response to the powered wireless device detecting the initialization request frame and recognizing the ID of the wireless device. In embodiments, the ID request frame triggering an attempt to initiate an encrypted wireless communication session with the powered wireless device.

FIG. 5 is a flow diagram of a method 500 that explains the example method 400 of FIG. 4 from a perspective of a powered wireless device according to at least one embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by processing logic of the powered wireless device 110 (FIG. 1A and FIG. 1C). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic at least periodically computes channel state information (CSI) data within wireless signals received within a local environment.

At operation 520, the processing logic de-spreads the CSI data at a predetermined chip rate to detect a bit pattern.

At operation 530, the processing logic determines that the bit pattern includes a starting pattern of an initialization request frame received from an ambient power (AMP) device. In embodiments, the initialization request frame is encoded using a known spreading code at the predetermined chip rate, and the method 500 further includes using the known spreading code in de-spreading the CSI data at operation 520.

At operation 540, the processing logic detects an identifier (ID) of the AMP device that follows the starting pattern.

At operation 550, the processing logic transmits, to the AMP device, in response to recognizing the ID of the AMP device, an ID request frame to trigger an attempt to initiate an encrypted wireless communication session with the AMP device.

Figure 6:
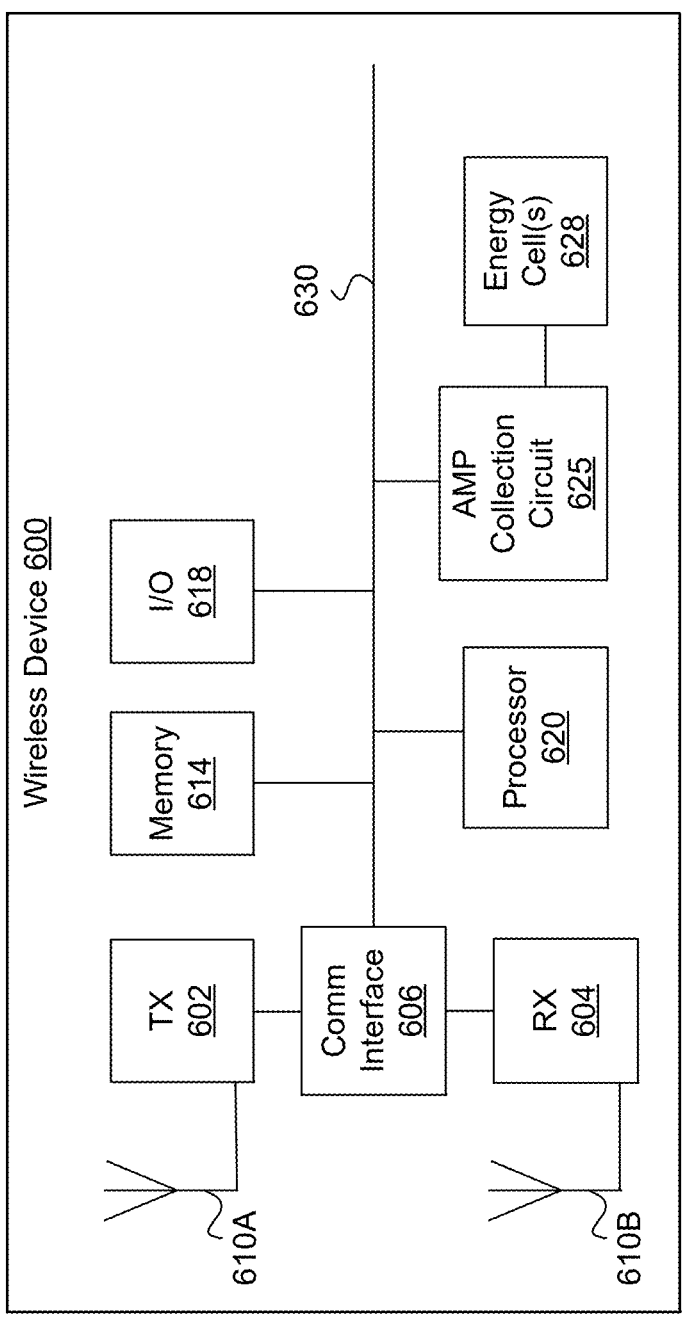
FIG. 6 is a simplified block diagram of an example wireless device, which may represent any of the powered wireless device or client wireless devices discussed herein according to aspects of the disclosure.

FIG. 6 is a simplified block diagram of an example wireless device 600, which may represent any of the powered wireless device 110 or client wireless devices discussed herein according to aspects of the disclosure. For example, the client wireless devices may include the AMP device 120. In at least some embodiments, the wireless device 600 includes, but is not be limited to, a transmitter 602 or TX (e.g., a WLAN transmitter), a receiver 604 or RX (e.g., a WLAN receiver), a communications interface 606, at least one TX antenna 610A coupled to the transmitter 602, at least one RX antenna 610B coupled to the receiver 604, a memory 614, one or more input/output (I/O) devices 618 (such as a display screen, a touch screen, a keypad, and the like), a processor 620, an AMP collection circuit 625, and energy cells 628. In embodiments, the wireless device 600 includes two antennas for multiple input, multiple output (MIMO) operation of a transceiver (e.g., including the TX and RX), which may include switching circuitry to switch between dual bands, including for example, the 2.4 GHz and 5 GHz bands.

These components can all be coupled to a communications bus 630 or multiple communication buses. In some embodiments, at least some of the components of the wireless device 600 are directly connected and may thus not be coupled through the communication bus 630. Thus, illustration of the communication bus 630 is not to be taken as required or limiting for at least some of the components of the wireless device 600, which may directly intercommunicate.

In some embodiments, aspects of the communication interface 606 work with the processor 620 to perform operations or that function as a processing device of the wireless device 600. In some embodiments, there is a single antenna and multiplexing logic to switch use of the antenna between the TX and RX. In some embodiments, the powered wireless device 110 has no energy harvester, and instead has a battery and/or is analog current (AC)-powered.

In at least some embodiments, the memory 614 includes storage to store instructions executable by the processor 620 and/or data generated by the communication interface 606. In various embodiments, frontend components such as the transmitter 602, the receiver 604, the communication interface 606, and one or more antennas are adapted with or configured for WLAN and WLAN-based frequency bands, e.g., Wi-Fi®, Bluetooth® (BT), Bluetooth® Low Energy (LBE), Ultra-Wideband (UWB), Z-wave™, Zigbee®, LoRa™, Wireless Smart Utility Network® (Wi-SUN®), or other wireless protocol. While some of the protocols may also be referred to as personal area network (PAN) technology, for simplicity, all are broadly referred to as WLAN technology. Future protocols are also envisioned.

In various embodiments, the communications interface 606 is integrated with the transmitter 602 and the receiver 604, e.g., as a frontend of the wireless device 600. The communication interface 606 may coordinate, as directed by the processor 620, to request/receive packets from other wireless devices or those that reflect off objects. The communications interface 606 can further process data symbols received by the receiver 604 in a way that the processor 620 can perform further processing, including identifying and parsing data packets received within the wireless signals. In some embodiments, the transmitter 602, receiver 604, communication interface 606, and antennas 610A and 610B can be referred to herein as a "wireless communication circuit."

In various embodiments, the AMP collection 625 performs operations disclosed herein in order to capture electromagnetic or RF signals and other types of non-RF energy, e.g., light, temperature gradients, pressure differential, mechanical vibrations, wind energy, and the like, which were discussed with referenced to FIG. 1A. As discussed, the AMP collection circuit 625, with reference to harvesting energy from RF wireless signals, may be a multi-band harvester in being configured to harvest energy from multiple ranges of frequencies that define different RF bands. In these embodiments, the AMP collection circuit 625 is also configured to store the harvested energy within the energy cells 628, which then operate as a power source for the wireless device 600.

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the operations described herein. The non-transitory computer-readable storage medium may include, but is not limited to, electromagnetic storage medium, read-only memory (ROM), random-access memory (RAM), erasable programmable memory (e.g., Erasable and Programmable Read Only Memory (EPROM) and Electrically Erasable and Programmable Read Only Memory (EEPROM)), flash memory, or another now-known or later-developed non-transitory type of medium that is suitable for storing information.

Although the operations of the circuit(s) and block(s) herein are shown and described in a particular order, in some embodiments the order of the operations of each circuit/ block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method comprising:
backscattering, by an ambient power (AMP) device that harvests environmental energy, radio frequency (RF) energy received in a wireless signal from at least one of a powered wireless device or a helper wireless device;
causing, by the AMP device, an initialization request frame to be transmitted to the powered wireless device within a backscattered signal using a first spreading code, wherein the first spreading code encodes a predetermined bit pattern, which is recognizable by the powered wireless device, and an identifier (ID) of the AMP device; and
receiving, from the powered wireless device, an ID request frame in response to the powered wireless device detecting the initialization request frame and recognizing the ID of the AMP device, the ID request frame triggering an attempt to initiate an encrypted wireless communication session with the powered wireless device.

2. The method of claim 1, wherein the first spreading code is at chip rate known to the powered wireless device and includes one of M-sequences, Kasami sequences, Barker codes, Walsh codes, pseudo-noise sequences, Zadoff-Chu sequences, or Gold codes.

3. The method of claim 1, further comprising:
waiting a random delay period in response to not receiving the ID request frame; and
causing, after waiting the random delay period, the initialization request frame to be retransmitted to the powered wireless device.

4. The method of claim 1, wherein the ID request frame comprises a spreading seed value, the method further comprising:
determining, from the spreading seed value, a second spreading code that is specific to the AMP device; and
employing the second spreading code to generate bit streams that are included in future frames transmitted to the powered wireless device.

5. The method of claim 4, wherein the second spreading code is shorter than the first spreading code or that eliminates spread-spectrum transmission altogether.

6. The method of claim 4, wherein the ID request frame comprises a session ID, the method further comprising:
retrieving, from a memory, a secret that is shared with the powered wireless device;
determining, using the secret, one or more authentication and key management (AKM) parameters; and
transmitting, to the powered wireless device, using the second spreading code, an ID response frame comprising the ID of the AMP device, the session ID, and the one or more AKM parameters with which the powered wireless device is to be mutually authenticated with the AMP device and to generate an encryption key to initiate the encrypted wireless communication session.

7. The method of claim 6, further comprising causing the ID of the AMP device to be listed first in the ID response frame to signal to the powered wireless device that the ID response frame is associated with the AMP device.

8. A method comprising:
periodically computing, by a powered wireless device, channel state information (CSI) data within wireless signals received within a local environment;
de-spreading, by the powered wireless device, the CSI data at a predetermined chip rate to detect a bit pattern;
determining that the bit pattern comprises a starting pattern of an initialization request frame received from an ambient power (AMP) device;
detecting, by the powered wireless device, an identifier (ID) of the AMP device that follows the starting pattern; and
transmitting, to the AMP device, in response to recognizing the ID of the AMP device, an ID request frame to trigger an attempt to initiate an encrypted wireless communication session with the AMP device.

9. The method of claim 8, wherein the initialization request frame is encoded using a known spreading code at the predetermined chip rate, the method further comprising using the known spreading code in de-spreading the CSI data.

10. The method of claim 8, wherein the CSI data include received signal strength indicator (RSSI) data, the method further comprising using the RSSI data for de-spreading the CSI data to detect the bit pattern.

11. The method of claim 8, further comprising at least one of:
transmitting a request to a helper wireless device that causes the helper wireless device to increase transmitting power directed at the AMP device; or
adjusting a direction of an antenna of the powered wireless device to be aimed at the AMP device.

12. The method of claim 8, wherein the ID request frame comprises a spreading seed value from which the AMP device for determining a device-specific spreading code.

13. The method of claim 12, wherein the device-specific spreading code is shorter than an original spreading code, transmitted at the predetermined chip rate, or that eliminates spread-spectrum transmission altogether.

14. The method of claim 12, wherein the ID request frame further comprises a session ID, the method further comprising:
de-spreading the CSI data at an updated chip rate, corresponding to the device-specific spreading code, to detect a second bit pattern in which is encoded an ID response frame received from the AMP device, wherein the ID response frame comprises the ID of the AMP device, which is positioned first, the session ID, and one or more authentication and key management (AKM) parameters; and
in response to detecting the ID of the AMP device, decoding a remainder of the ID response frame received from the AMP device to obtain the one or more AKM parameters with which to initiate the encrypted wireless communication session with the AMP device.

15. A first wireless device comprising:
an ambient power (AMP) collection circuit;

at least one antenna; and a processing device coupled to the AMP collection circuit and the at least one antenna, the processing device for causing the at least one antenna to:

backscatter, by the AMP collection circuit that harvests environmental energy, radio frequency (RF) energy received in a wireless signal from at least one of a powered wireless device or a helper wireless device;

transmit an initialization request frame to the powered wireless device within a backscattered signal using a first spreading code, wherein the first spreading code encodes a predetermined bit pattern, which is recognizable by the powered wireless device, and an identifier (ID) of the first wireless device; and receive, from the powered wireless device, an ID request frame in response to the powered wireless device detecting the initialization request frame and recognizing the ID of the first wireless device, the ID request frame triggering an attempt to initiate an encrypted wireless communication session with the powered wireless device.

16. The first wireless device of claim 15, wherein the processing device is for:

waiting a random delay period in response to not receiving the ID request frame; and causing, after waiting the random delay period, the at least one antenna to retransmit the initialization request frame to the powered wireless device.

17. The first wireless device of claim 15, wherein the ID request frame comprises a spreading seed value, and wherein the processing device is for:

determining, from the spreading seed value, a second spreading code that is specific to the wireless device; and employing the second spreading code to generate bit streams that are included in future frames transmitted to the powered wireless device.

18. The first wireless device of claim 17, wherein the second spreading code is shorter than the first spreading code or that eliminates spread-spectrum transmission altogether.

19. The first wireless device of claim 17, wherein the ID request frame comprises a session ID, and wherein the processing device is for:

retrieving, from a memory, a secret that is shared with the powered wireless device;

determining, using the secret, one or more authentication and key management (AKM) parameters; and causing the at least one antenna to transmit, to the powered wireless device, using the second spreading code, an ID response frame comprising the ID of the first wireless device, the session ID, and the one or more AKM parameters with which the powered wireless device is to be mutually authenticated with the first wireless device and to generate an encryption key to initiate an encrypted wireless communication session.

20. The first wireless device of claim 19, wherein the processing device is for causing the ID of the first wireless device to be listed first in the ID response frame to signal to the powered wireless device that the ID response frame is from the first wireless device.

* * * * *